United States Patent [19]

Giddings et al.

[11] 4,193,903

[45] Mar. 18, 1980

[54] RAPID REMOVAL OF RESIDUAL MONOMERS FROM ACRYLONITRILE COPOLYMERS

[75] Inventors: Brandford E. Giddings, Warrensville Heights; Eddie Wardlow, Jr., Cleveland; Brian L. Mehosky, Maple Heights, all of Ohio

[73] Assignee: Standard Oil Company, Cleveland, Ohio

[21] Appl. No.: 906,538

[22] Filed: May 17, 1978

[51] Int. Cl.$^2$ ............................................... C08F 6/24
[52] U.S. Cl. .................... 260/29.6 R; 260/29.6 AN; 260/29.6 PT; 260/32.6 N; 526/200; 526/329.2; 526/331; 528/500
[58] Field of Search ................ 528/500; 260/29.6 R, 260/29.6 AN, 29.6 PT

[56] References Cited

U.S. PATENT DOCUMENTS

| 3,325,457 | 6/1967 | Finestone et al. | 528/500 |
| 3,454,542 | 7/1969 | Cheape et al. | 528/500 |
| 3,491,071 | 1/1970 | Lanzo | 528/500 |

*Primary Examiner*—Stanford M. Levin
*Attorney, Agent, or Firm*—John F. Jones; Larry W. Evans

[57] ABSTRACT

A method for stripping residual monomer from acrylonitrile copolymers which have been prepared in aqueous suspension by steam stripping acrylonitrile monomer from the suspension at a temperature of from 100° C. up to 135° C. and at a pressure of from about 5 to 30 psig is described.

4 Claims, No Drawings

RAPID REMOVAL OF RESIDUAL MONOMERS FROM ACRYLONITRILE COPOLYMERS

This invention relates to a process for the removal of residual monomer from acrylonitrile copolymers prepared in aqueous suspension and more particularly pertains to a process for stripping under pressure residual monomer from acrylonitrile copolymers which have been prepared in aqueous suspension.

Acrylonitrile copolymer resins, and particularly those containing more than 50% by weight of acrylonitrile in them, which are prepared by the copolymerization of acrylonitrile with one or more other comonomers which are copolymerizable with acrylonitrile in aqueous suspension usually contain appreciable amounts (20 to 1000 ppm or thereabout) of residual acrylonitrile monomer which is not easily removed from the resin by ordinary means. Stripping and steam stripping of the aqueous suspension of resin at ambient or reduced pressures are the usually employed techniques for removal of residual monomer from the resin. These techniques are usually tedious involving many hours of stripping time and the use of a considerable amount of energy in the form of heat, both of which add to the final cost of the resin. Resins of this type are often used to make containers for foods, drugs and cosmetics and thus must be essentially free of residual monomers because of the safety requirements for these packaged materials.

We have discovered that acrylonitrile copolymers, particularly those made with 50% by weight of more of acrylonitrile, can be purged of residual monomer remaining in them after completion of aqueous suspension polymerization by stripping these polymers at ambient temperature or somewhat above under a pressure which is somewhat above ambient pressure. Preferably, the acrylonitrile copolymer resins are stripped in the temperature range of from above 100° C. up to 135° C. and at a pressure in the range of from about 5 psig to 30 psig.

The resins to be employed in the process of this invention are composed of an olefinically unsaturated nitrile and another monomer component copolymerizable with said olefinically unsaturated nitrile.

These polymers are those produced by polymerizing a major proportion of a monounsaturated nitrile, such as acrylonitrile, and a minor proportion of another monovinyl monomer component in an aqueous dispersion.

The olefinically unsaturated nitriles useful in the present invention are the alpha,beta-olefinically unsaturated mononitriles having the structure

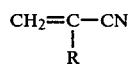

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred are acrylonitrile, methacrylonitrile, and mixtures thereof.

The other monovinyl monomer component copolymerizable with the olefinically unsaturated nitriles which are useful in this invention includes one or more of the vinyl aromatic monomers, esters of olefinically unsaturated carboxylic acids, vinyl esters, vinyl ethers, alpha-olefins, indene, and others.

The vinyl aromatic monomers include styrene, alpha-methyl styrene, the vinyl toluenes, the vinyl xylenes, and the like. Most preferred is styrene.

The esters of olefinically unsaturated carboxylic acids include those having the structure

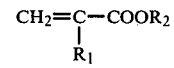

wherein $R_1$ is hydrogen, an alkyl group having from 1 to 4 carbon atoms, or a halogen, and $R_2$ is an alkyl group having from 1 to 6 carbons atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

wherein R' and R" are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

Indene (1-H-indene) is also included as a comonomer for use in this invention.

The polymers useful in this invention are those prepared by the polymerization of 100 parts by weight of (A) at least 50% by weight of at least one nitrile having the structure

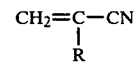

wherein R has the foregoing designation and (B) up to 50% by weight based on the combined weight of (A) plus (B) of at least one member selected from the group consisting of (1) styrene, (2) an ester having the structure

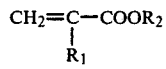

wherein $R_1$ and $R_2$ have the foregoing designations, (3) an alpha-olefin having the structure

wherein $R'$ and $R''$ have the foregoing designations, (4) a vinyl ether selected from the group consisting of methyl vinyl ether, ethyl vinyl ether, the propyl vinyl ethers, and the butyl vinyl ethers, (5) vinyl acetate, and (6) indene.

Preferably, component (A) should be present in from about 60 to 90% by weight based on the combined weight of (A) plus (B).

Suspending agents useful in the manufacture and monomer removal process of this invention include well known materials for this purpose such as polyvinyl alcohol, polyvinyl pyrrolidone, hydroxyethyl cellulose, carboxymethyl cellulose, polyacrylic acid, lecithin, gelatin, calcium phosphate, and others.

The polymers produced by the process of this invention are thermoplastic materials which can be thermoformed into a wide variety of useful articles by any of the conventional means for processing thermoplastic materials such as by extrusion, milling, molding, drawing, blowing, and the like. The polymers have excellent solvent resistance and they are particularly useful for the manufacture of bottles, film, sheet, pipe, and the like.

The following examples will further illustrate the present invention in greater detail; however, it is to be understood that the scope of this invention is not to be limited by these examples.

EXAMPLE 1

A. A terpolymer of 75 acrylonitrile, 20 styrene and 5 methyl acrylate was prepared in aqueous suspension using the following recipe:

| Ingredient | Parts |
| --- | --- |
| Acrylonitrile | 75 |
| Styrene | 20 |
| Methyl acrylate | 5 |
| Water | 200 |
| Hydroxyethyl cellulose | 0.2 |
| Pentaerythritoltetrakis (2-mercaptopropionate) | 1.0 |
| Azobisisobutyronitrile | 0.3 |

All of the ingredients except styrene and 4 parts of methyl acrylate were placed in a polymerization reactor, the reactor was swept with nitrogen and stirring was started and continued throughout the reaction. The reaction mixture was brought to 70° C. and the styrene and remainder of the methyl acrylate were added continuously during the reaction period of 2 and ½ hours. The resulting resin dispersion was isolated by filtration and was dried. When a sample of this resin was dissolved in dimethyl formamide and the volatiles from the resulting solution were analyzed by gas chromatography, there was observed the presence of 16,360 ppm of acrylonitrile, 2660 ppm of styrene and 2455 ppm of methyl acrylate monomers in the resin.

B. This experiment is outside the scope of this invention. A sample of 100 parts by weight of resin from A above was suspended in 900 parts of water along with 0.8 part of hydroxyethyl cellulose and a trace of an antifoaming agent. This suspension was heated to 100° C. at atmospheric pressure and the water and other volatiles were allowed to pass out of the mixture during this period. The final resin treated in this manner was dried and found to contain 16 ppm of acrylonitrile, less than 11 ppm of methyl acrylate and 91 ppm of styrene.

C. The procedure of B above was repeated at 120° C. and 15 psig to produce a dried resin containing less than 11 ppm of acrylonitrile, less than 11 ppm of methyl acrylate and 33 ppm of styrene in it.

EXAMPLE 2

A. A repeat of the procedure of Example 1B except that 300 parts of resin were suspended in 700 parts of water and a 90-minute time was used gave a dried resin containing less than 11 ppm of acrylonitrile, less than 11 ppm of methyl acrylate and 232 ppm of styrene.

B. A repeat of A of this example at 120° C. and 15 psig resulted in a dried resin containing less than 11 ppm of acrylonitrile, less than 11 ppm of methyl acrylate and 35 ppm of styrene.

EXAMPLE 3

A. The procedure of Example 1A was repeated except that the terpolymer resulted from the polymerization of 75 parts of acrylonitrile, 13 parts of styrene and 12 parts of vinyl acetate. This resin was found to contain 1.4% of residual acrylonitrile, 0.18% of residual styrene and 1.97% of residual vinyl acetate monomers.

B. The procedure of Example 1C was repeated at 17–20 psig on the resin from A of this example. The final resin was found to contain no detectable residual acrylonitrile, 80 ppm of residual styrene and no detectable vinyl acetate.

We claim:

1. A process which comprises steam stripping residual nitrile monomer from an aqueous suspension of a resin at a temperature in the range of from about 100° C. up to 135° C. and at a pressure of from about 5 to 30 psig, said resin having been prepared in aqueous suspension by the free-radical polymerization of a mixture of (A) at least 50% by weight of at least one nitrile monomer having the structure

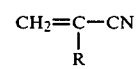

wherein R is hydrogen, a lower alkyl group having from 1 to 4 carbon atoms, or a halogen, and
(B) up to 50% by weight based on the combined weight of (A) plus (B) of at least one member selected from the group consisting of
(1) styrene,
(2) an ester having the structure

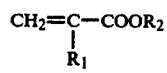

wherein $R_1$ is hydrogen, an alkyl group having from 1 to 4 carbon atoms, or a halogen, and $R_2$ is an alkyl group having from 1 to 6 carbon atoms, (3) an alpha-olefin having the structure

wherein R' and R" are alkyl groups having from 1 to 7 carbon atoms, (4) a vinyl ether selected from the group consisting of methyl vinyl ether, ethyl vinyl ether, the propyl vinyl ethers, and the butyl vinyl ethers, (5) vinyl acetate, and (6) indene.

2. The process of claim 1 wherein (A) is acrylonitrile.

3. The process of claim 2 wherein (B) is styrene.

4. The process of claim 2 wherein (B) is methyl acrylate.